(12) United States Patent
Chen et al.

(10) Patent No.: US 7,684,587 B2
(45) Date of Patent: Mar. 23, 2010

(54) REDUCED-REFERENCE VISUAL COMMUNICATION QUALITY ASSESSMENT USING DATA HIDING

(75) Inventors: Meng Chen, Frederick, MD (US); George Bailey, Gaithersburg, MD (US)

(73) Assignee: Spirent Communications of Rockville, Inc., Rockville, MD (US)

(*) Notice: Subject to any disclaimer, the term of this patent is extended or adjusted under 35 U.S.C. 154(b) by 1023 days.

(21) Appl. No.: 11/396,911

(22) Filed: Apr. 4, 2006

(65) Prior Publication Data

US 2006/0269162 A1   Nov. 30, 2006

Related U.S. Application Data

(60) Provisional application No. 60/667,692, filed on Apr. 4, 2005.

(51) Int. Cl.
*G06K 9/00* (2006.01)
*H04N 7/12* (2006.01)

(52) U.S. Cl. .................. 382/100; 375/240.27
(58) Field of Classification Search ............... None
See application file for complete search history.

(56) References Cited

U.S. PATENT DOCUMENTS

| | | | | |
|---|---|---|---|---|
| 5,444,489 A * | 8/1995 | Truong et al. | ......... | 375/240.22 |
| 5,926,226 A * | 7/1999 | Proctor et al. | ......... | 375/240.22 |
| 6,396,958 B1 * | 5/2002 | Wilson | ......... | 382/246 |
| 6,456,726 B1 * | 9/2002 | Yu et al. | ......... | 382/100 |
| 6,507,672 B1 * | 1/2003 | Watkins et al. | ......... | 382/232 |
| 6,556,690 B1 * | 4/2003 | Nelson | ......... | 382/100 |
| 7,020,304 B2 * | 3/2006 | Alattar et al. | ......... | 382/100 |
| 7,099,518 B2 * | 8/2006 | Li et al. | ......... | 382/255 |
| 7,246,239 B2 * | 7/2007 | Rodriguez et al. | ......... | 713/176 |
| 7,292,708 B2 * | 11/2007 | Lee et al. | ......... | 382/100 |
| 2002/0104003 A1 * | 8/2002 | Iwamura | ......... | 713/176 |
| 2003/0023910 A1 * | 1/2003 | Myler et al. | ......... | 714/704 |
| 2004/0028139 A1 * | 2/2004 | Zaccarin et al. | ......... | 375/240.24 |
| 2006/0133645 A1 * | 6/2006 | Rhoads et al. | ......... | 382/100 |
| 2006/0233442 A1 * | 10/2006 | Lu et al. | ......... | 382/190 |

OTHER PUBLICATIONS

Lin et al, "An error resilient coding scheme for H.26L video transmission based on data embedding", J. Vis. Commun. Image R., 15 (2004) 214-240.*

(Continued)

*Primary Examiner*—Yuzhen GE
(74) *Attorney, Agent, or Firm*—Gilberto M. Villacorta; Phillip J. Articola; Foley & Lardner LLP (57) ABSTRACT

A method and system of communicating visual communication quality information, includes extracting reduced-reference (RR) feature data from visual content, embedding the RR feature data in the visual content; and transmitting the visual content with the embedded RR feature data. Visual communication quality is assessed by receiving visual content which includes visual content data and a first set of embedded RR feature data, retrieving the first set of RR feature data from the visual content data, and generating a second set of RR feature data from the visual content data. The second set of RR feature data corresponds to substantially identical features of the visual content data as that used to generate the first set of RR feature data. The first set of RR feature data is compared to the second first set of RR feature data to determine a quality of the visual content based upon the comparison.

18 Claims, 10 Drawing Sheets

OTHER PUBLICATIONS

Kang et al, IEEE International Conference on Acoustics, Speech, and Signal Processing, 2004. Proceedings. (ICASSSP '04), Publication Date: May 17-21, 2004, vol. 3, on pp. iii-257-60 vol. 3.*

Kwok, Wilson et al., "Multi-Directional Interpolations for Spatial Error Concealment", *IEEE Transactions on Consumer Electronics*, vol. 39, No. 3, pp. 455-460, (Aug. 1993).

Wang, Zhou et al., "Reduced-Reference Image Quality Assessment Using a Wavelet-Domain Natural Image Statistic Model", *SPIE-IS&T*, vol. 5666, pp. 149-159, (2005).

Sheikh, Hamid R. et al., Blind Quality Assessment of JPEG2000 Compressed Images Using Natural Scene Statistics, *SPIE-IS&T*, vol. 5666, pp. 1403-1407, (Jan. 2005).

Solanki, K. et al., "High-Volume Data Hiding in Images: Introducing Perceptual Criteria Into Quantization Based Embedding", *2002 IEEE International Conference on Acoustics, Speech, and Signal Processing*, pp. IV-3485-IV-3488, (May 2002).

Wolf, Stephen et al., "Low Bandwidth Reduced Reference Video Quality Monitoring System", ITS and NTIA, Boulder, CO, 4 pages.

Wu, Min et al., "Data Hiding in Image and Video: Part I—Fundamental Issues and Solutions", *IEEE Transactions on Image Processing*, vol. 12, No. 6, pp. 685-695, (Jun. 2003).

Wu, Min et al., "Multi-level Data Hiding for Digital Image and Video", *IEEE Transactions on Image Processing*, vol. 12, No. 6, 13 pages, (Jun. 2003).

Wicker, Stephen B., "Error Control Systems for Digital Communication and Storage", Table of Contents, 9 pages.

International Telecommunication Union, J.144, "Objective perceptual video quality measurement techniques for digital cable television in the presence of a full reference", (Mar. 2001).

Kusuma et al, "A Reduced-Reference Perceptual Quality metric for In-Service Image Quality Assessment", Symposium on Trends in Communications, Oct. 26-28, 2003m pp. 71-74.

* cited by examiner

TABLE I
THE EXPERIMENTAL RESULT OF RR IMAGE QUALITY ASSESSMENT USING DATA HIDING.

| Image Block loss | Fishingboat 5% | Fishingboat 10% | Fishingboat 20% | Elaine 5% | Elaine 10% | Elaine 20% |
|---|---|---|---|---|---|---|
| Distortion score reported by RR scheme | 2.3859 | 3.1534 | 3.5367 | 2.3795 | 3.2673 | 3.6340 |
| Distortion score reported by our RR with data hiding scheme | 2.4625 | 3.1587 | 3.6982 | 2.3917 | 3.3243 | 3.7438 |

REDUCED-REFERENCE VISUAL COMMUNICATION QUALITY ASSESSMENT USING DATA HIDING

CROSS-REFERENCE TO RELATED PATENT APPLICATIONS

This application claims the benefit of priority under 35 U.S.C. §119(e) of provisional application No. 60/667,692 filed on Apr. 4, 2005, the disclosure of which is incorporated by reference herein in its entirety.

BACKGROUND OF THE INVENTION

With the rapid growth of multimedia service, quality assessment for visual communication system has becomes more important and has attracted research and industrial attention. In the two main categories of assessment approaches, the subjective assessment, such as Mean Opinion Score (MOS), is very tedious, expensive and difficult to be conducted automatically. The objective metrics based assessments, on the other hand, are more suitable for automatic quality assessment system. Objective visual quality metrics can be divided into three main categories: full-reference (FR) metrics, reduced-reference (RR) metrics and no-reference (NR) metrics. As these names indicate, these three types of quality assessment metrics can be exploited in the system with full availability, limited availability and no availability of the original visual content.

A lot of FR metrics have been investigated in recent years and recommended by ITU. See ITU-T J.144 "Objective perceptual video quality measurement techniques for digital cable television in the presence of a full reference", Seies J: *Cable Networks and Transmission of Television, Sound Programme and Other Multimedia Signals—Measurement of the Quality of Service*, March 2003. Though the results are well correlated with the human visual system, it is not very suitable for in-service automatic quality assessment of most visual transmission systems. In most visual communication applications, such as broadcasting TV and video on demand, the original visual content are not available at the point of evaluation. It could be argued that a set of known visual content could give a quality assessment for the visual transmission system. However, unlike voice, most popular image or video compression techniques such as JPEG and MPEG are variable bit rate compression so that the transmission rate is highly dependent on the characteristics of the visual content. The large variation of characteristics from image to image make it hard to emulate the true content for visual transmission system when a problem is reported. Therefore, assessing a set of known images does not provide a good surrogate for assessing the quality of a variable bit rate visual communication. Furthermore, the visual content characteristics also have an impact on transmission and restoration techniques. Therefore, FR visual quality assessment does not easily support a visual communication system quality assessment.

Without the availability of the reference visual content, NR visual quality assessment could provide an alternative. However, this is a very difficult task and is largely unexplored. Currently, NR model has acceptable performance only when the prior knowledge of the types of image distortion or all the components in the transmission system is available. See, for example, Z. Wang and E. P. Simoncelli, REDUCED-REFERENCE IMAGE QUALITY ASSESSMENT USING A WAVELET-DOMAIN NATURAL IMAGE STATISTIC MODEL, *Human Vision and Electronic Imaging X*, Proc. SPIE, vol. 5666, San Jose, Calif., January 2005; H. R. Sheikh, A. C. Bovik, and L. Cormack, BLIND QUALITY ASSESSMENT OF JPEG2000 COMPRESSED IMAGES USING NATURAL SCENE STATISTICS, *Proc. IEEE Asilomar Conf on Signals, Systems, and Computers*, November 2003, Pacific Grove, Calif.

SUMMARY OF THE INVENTION

One embodiment of the invention relates to a system for communicating visual communication quality information, including a feature extractor configured to receive visual content, wherein the feature extractor is configured to extract reduced-reference (RR) feature data from the visual content; a feature data embedder in communication with the feature extractor, wherein the feature data embedder is configured to embed the RR feature data in the visual content; and a transmitter in communication with the feature data embedder, wherein the transmitter is configured to transmit the visual content with the embedded RR feature data.

Certain embodiments of the system include a feature data encoder in communication with the feature extractor and the feature data embedder, wherein the feature data encoder is configured to encode the RR feature data.

In certain embodiments the feature data encoder is configured to compress the RR feature data from the feature data extractor when the RR feature data comprises a high bit rate.

In certain embodiments, the system includes a visual content encoder in communication with the feature data embedder and the transmitter, wherein the visual content encoder is configured to encode the visual content.

In certain embodiments, the feature data embedder is configured to distribute the RR feature data throughout the visual content.

In certain embodiments, the feature data embedder embeds the feature data in a second frame subsequent to a first frame from which the feature extractor extracts the feature data.

In certain embodiments, the feature data embedder embeds a synchronization header which specifies a relationship between the feature data embedded in the second frame and the first frame from which the feature data is extracted.

In certain embodiments, the feature data embedder distributes the feature data in a layered pattern away from a center area of an image or video frame included in the visual content.

In certain embodiments, the present invention includes a system for assessing visual communication quality, including: a receiver configured to receive visual content, wherein the visual content includes visual content data and a first set of reduced-reference (RR) feature data, and wherein the first set of RR feature data is embedded in the visual content data; a feature data retriever wherein the feature data retriever is configured to retrieve the first set of RR feature data from the visual content data; a feature extractor wherein the feature extractor is configured to generate a second set of RR feature data from the visual content data, wherein the second set of RR feature data corresponds to substantially identical features of the visual content data as that used to generate the first set of RR feature data; and a visual communication quality assessor in communication with the feature data retriever and the feature extractor, wherein the visual communication quality assessor is configured to compare the first set of RR feature data and the second first set of RR feature data, and determine a quality of the visual content based upon the comparison.

In certain embodiments, the system further includes a feature data decoder in communication with feature data retriever and the visual communication quality assessor, wherein the first set of RR feature data is encoded, and wherein the feature data decoder is configured to decode the encoded first set of RR feature data.

In certain embodiments, the present invention provides a method of communicating visual communication quality information, including the steps of: extracting reduced-reference (RR) feature data from visual content; embedding the RR feature data in the visual content; and transmitting the visual content with the embedded RR feature data.

In certain embodiments, the method further includes the step of: encoding the extracted RR feature data.

In certain embodiments, the step of embedding the RR feature data in the visual content includes embedding the feature data in a second set of frames subsequent to a first set of frames from which the feature data is extracted.

In certain embodiments, the step of embedding the RR feature data in the visual content further includes embedding a synchronization header which specifies a relationship between the feature data embedded in the second frame and the first frame from which the feature data is extracted.

In certain embodiments, the step of distributing the RR feature data throughout the visual content includes distributing the feature data in a layered pattern away from a center area of an image or video frame included in the visual content.

In certain embodiments, the present invention comprises a method of assessing visual communication quality, including the steps of: receiving visual content, wherein the visual content includes visual content data and a first set of reduced-reference (RR) feature data, and wherein the first set of RR feature data is embedded in the visual content data; retrieving the first set of RR feature data from the visual content data; generating a second set of RR feature data from the visual content data, wherein the second set of RR feature data corresponds to substantially identical features of the visual content data as that used to generate the first set of RR feature data; comparing the first set of RR feature data and the second first set of RR feature data, and determining a quality of the visual content based upon the comparison.

BRIEF DESCRIPTION OF THE DRAWINGS

The accompanying drawings, which are incorporated in and constitute a part of the specification, illustrate embodiments of the invention and together with the description, serve to explain the principles of the invention.

DETAILED DESCRIPTION OF THE EMBODIMENTS

In view of the deficiencies of the FR and NR techniques for visual communication quality assessment discussed earlier herein, one would consider the applicability of the RR metrics, which provide just-enough visual content information to facilitate the quality assessment. The general design goal of the RR visual quality assessment is measuring the visual quality with partial information of the referencevisual content. The partial information is extracted from the original visual content at the originating point and the received visual content at the evaluating point. The quality assessment is performed by comparison between these two sets of partial information. Since the data rate of the partial information is much lower than data rate of the visual content, it is more practical to transmit the partial information to the evaluating point. In this application, this partial visual content information is called RR feature data.

In the prior efforts, an ancillary channel is an essential component for transferring the RR feature data of the original visual content to the evaluating point or transferring the RR feature data of the received visual content to the originating point. See, for example, H. R. Sheikh, A. C. Bovik, and L. Cormack, BLIND QUALITY ASSESSMENT OF JPEG2000 COMPRESSED IMAGES USING NATURAL SCENE STATISTICS, *Proc. IEEE Asilomar Conf on Signals, Systems, and Computers*, November 2003, Pacific Grove, Calif. However, in view of the large variance of network protocols for visual communication systems, it should be noted that the ancillary channel involves tremendous work to be compatible with various network protocols. Therefore, one alternative is attaching the RR feature data to the visual content and transmit the visual content and the RR feature data over the same channel. The robustness of the attaching scheme causes concerns. Most of time, the quality assessment system is employed independently from the visual communication system (like the majority of service assurance systems employed for the various communication systems). The failure of stripping out the attached RR feature data impairs the decoding of the received data stream at the end user.

Accordingly, embodiments of the present invention seek to alleviate the difficulty of practically realizing the RR visual quality assessment by providing a RR visual quality assessment scheme or system without using an ancillary channel or an attaching scheme and is thus compatible with most network protocols used in visual communication systems. Accordingly, the present application provides a method and system that provides RR visual quality assessment using data hiding. This method exploits an appropriate data hiding technique to convey the RR feature data so that it is compatible to all the network protocols used by visual communication systems and the receiver system of the end user is able to decode the visual content stream without a large impairment from overhead introduced by the quality assessment system. In certain embodiments, the RR visual quality assessment method provided herein includes a transmitter driven pseudo-passive monitoring deployment scheme for visual communications quality assessment.

Figure 1:
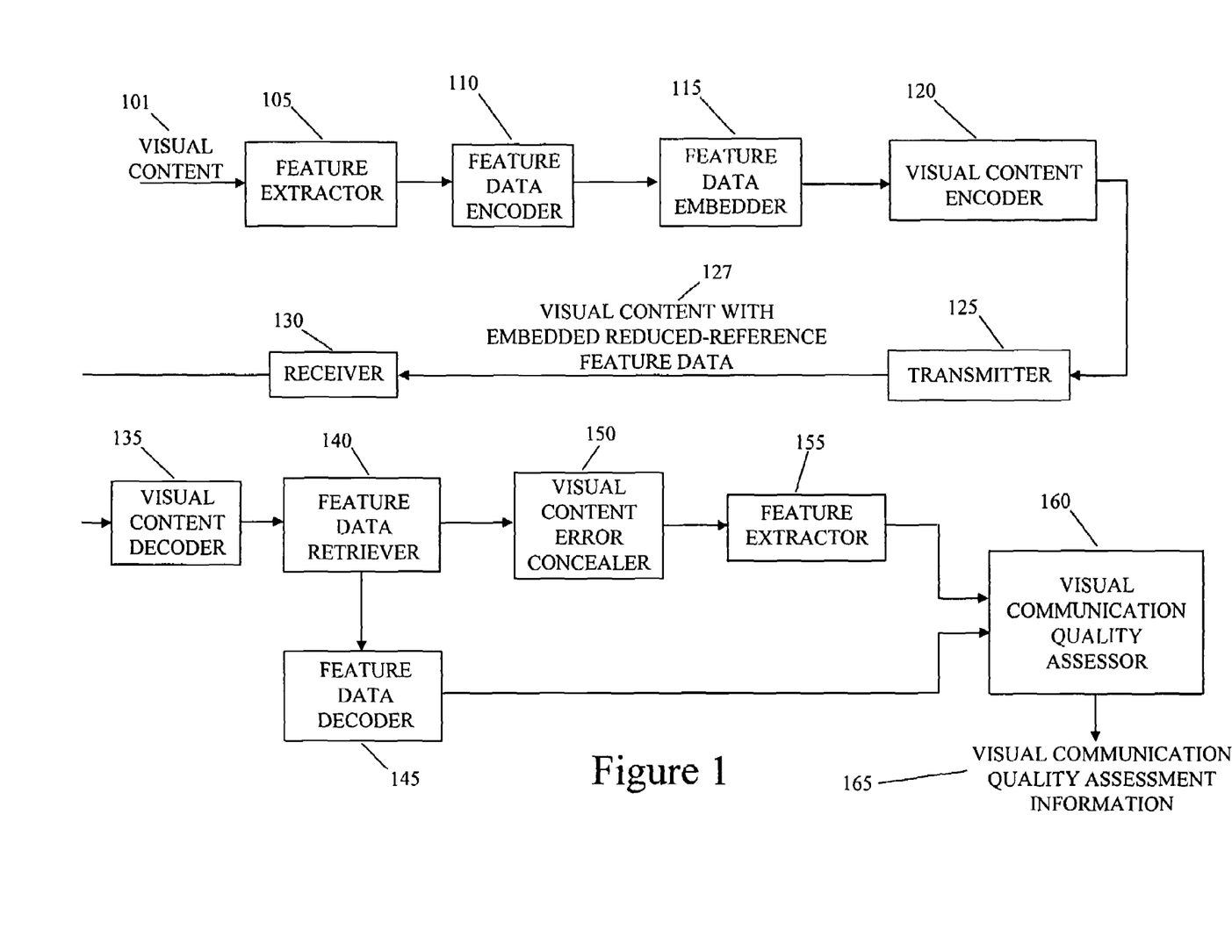
FIG. 1 is high level block diagram that illustrates the components of one embodiment of the present invention.

FIG. 1 is high level block diagram that illustrates the components of one embodiment of the present invention. It should be understood that FIG. 1 is exemplary only and one skilled in the art would recognize various modifications and alternatives all of which are considered as part of the present invention. Visual content 101 (for example, a video stream) is transmitted from a transmitter 125 to a receiver 130 over a communication link. Connected to the receiver 130 is a visual communication quality assessor 160 which provides visual communication quality assessment information 165 based on reduced-reference (RR) feature data as discussed in detail further herein.

A feature extractor 105 extracts the RR feature data from the incoming visual content (which is to be transmitted) and the feature data is encoded in a feature data encoder 110. A feature data embedder 115 and a visual content encoder 120 then process the visual content with embedded RR feature data so that it is ready for transmission by the transmitter 125.

Once the visual content with embedded RR feature data 127 is received at the receiver 130, it is decoded by a visual content decoder 135 after which a feature data retriever 140 retrieves the transmitted embedded feature data which is then processed by a feature data decoder 145. A visual content error concealer 150 also processes the decoded visual content which is then processed by a feature extractor 155 which extracts the same RR feature data that was embedded on the transmitting side. The RR feature data extracted by the feature extractor 155 and the feature data decoded by the feature data decoder 145 are then used as input to the visual communication quality assessor 160. The visual communication quality assessor 160 then performs a quality assessment of the visual communication based on this input and outputs the visual communication quality assessment information 165.

One skilled in the art would recognize that the components shown in FIG. 1 are logical components that may be implemented on suitable computing and communication apparatus. Some of these components may be omitted or several of these components may be combined on one or more computing and communication apparatus as would be recognized by one skilled in the art.

Details of most of these components are described in the context of a detailed embodiment of the present system and method which is described in the following sections as follows. The system architecture is presented in Section I. The details of the deployment schemes and design issues are described in Section II. An example of the RR visual quality assessment system using data hiding for still image is described in Section III.

I. System Architecture

Figure 2:
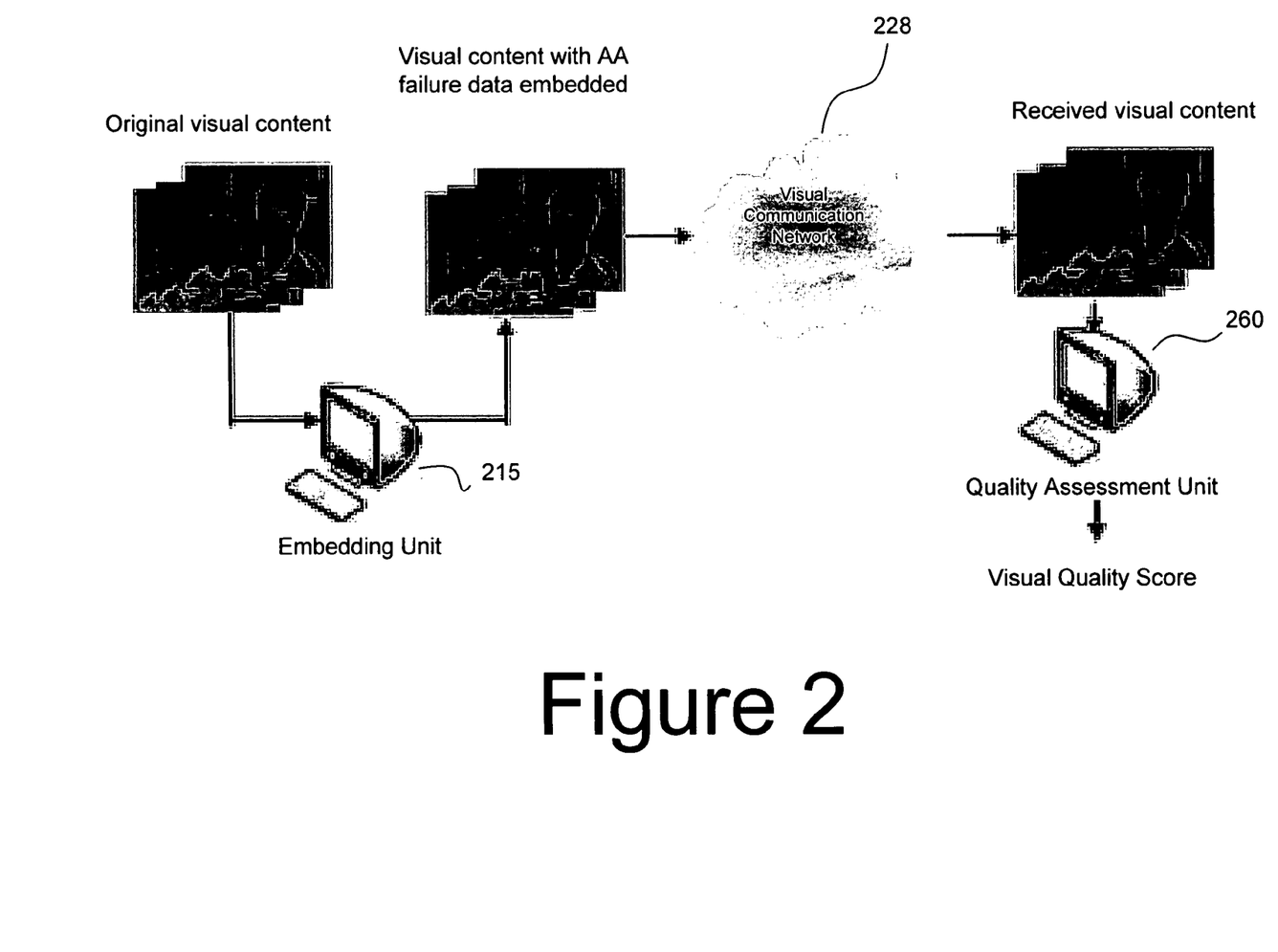
FIG. 2 is a schematic diagram that illustrates the embedding of RR feature data in the transmitted visual content.

Data hiding is the process by which a message signal, or signature, is covertly embedded within a host data set to form a composite signal. See K. Solanki, N. Jacobsen, S. Chandrasekaran, U. Madhow, and B. S. Manjunath, HIGH-VOLUME DATA HIDING IN IMAGES: INTRODUCING PERCEPTUAL CRITERIA INTO QUANTIZATION BASED EMBEDDING, in *Proc. IEEE Int'l Conf. Acoustic, Speech and Signal Processing*, 2002, pp. 3485-3488. In the visual quality assessment method proposed herein, the data hiding technique is envisioned as a general way to convey side information (for example, RR feature data) with minimal perceptual degradation. It provides an appealing alternative by data hiding instead of attaching the information directly into the visual content itself. By introducing this advanced technique into traditional visual quality assessment scheme, the embedding of RR feature data in the visual content is depicted schematically in FIG. 2. Therefore, as shown in FIG. 2, an embedding unit 215 (which provides an example of a combined feature extractor 105, a feature data encoder 110, a feature data embedder 115 and a visual content encoder 120) embeds or hides RR feature data in the visual content that is transmitted over a visual communication network 228. The received visual content (with the embedded RR feature data) is then assessed by a quality assessment unit 260 (which provides an example of a combined visual content decoder 135, a feature data retriever 140, a visual content error concealer 150, a feature extractor 155, a feature data decoder 145, and a visual communication quality assessor 160) which outputs visual quality score (an example of the visual communication quality assessment information 165).

The embedding unit 215 could be the visual content transmitter, or could be a probe equipment located at an intermediate point of a communication system (located before the receiver). The quality assessment unit 260 may be referred to further herein as an assessment unit for simplicity. This assessment unit 260 could be the visual content receiver, or could be a probe equipment located at an intermediate point of a visual communication system (located after the transmitter).

Figure 3:
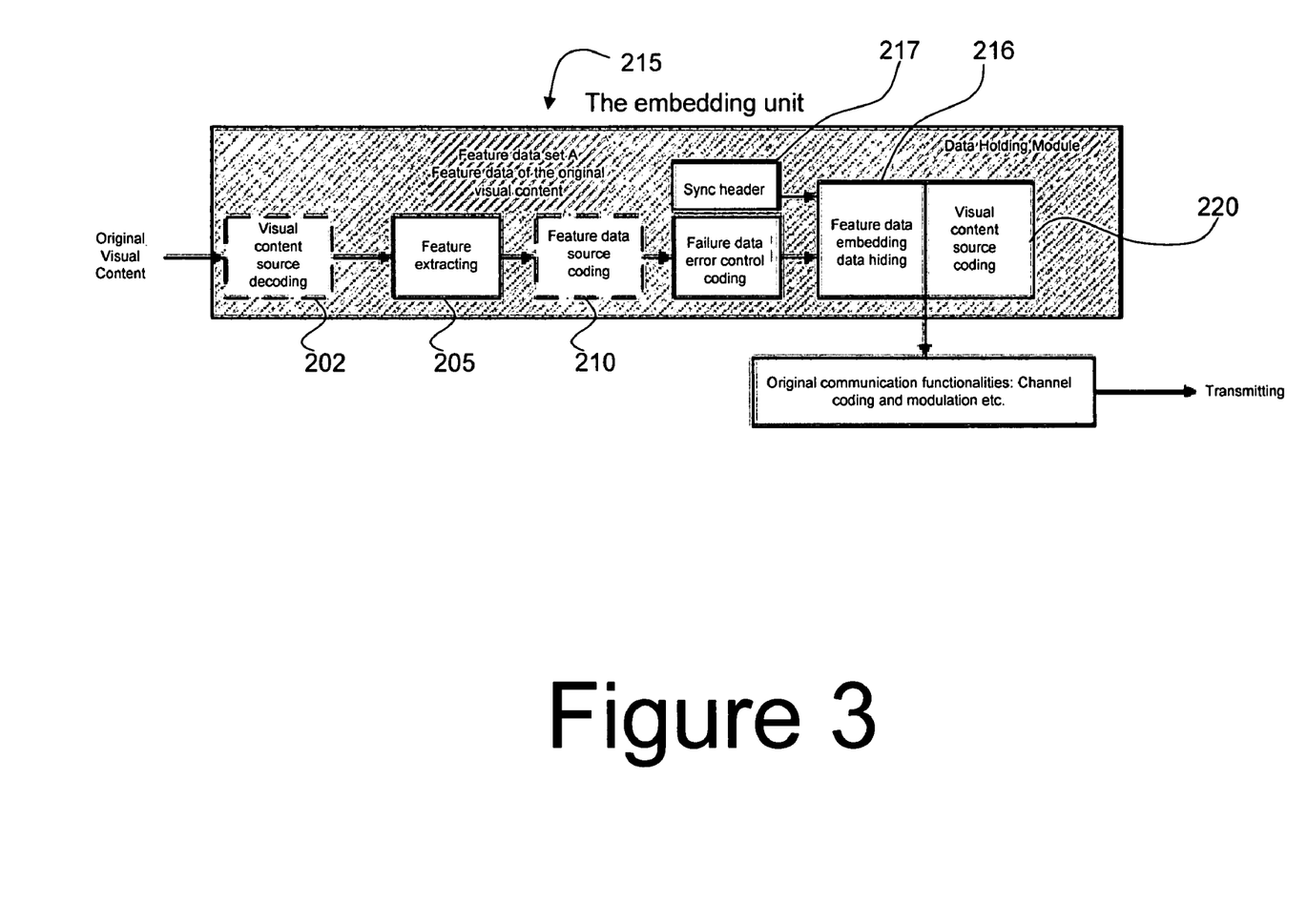
FIG. 3 illustrates one embodiment of an embedding unit.

As shown in FIG. 3, the data hiding module resides in the embedding unit 215. The embedding unit 215 initially stores the visual content in an input buffer. If the received visual content is compressed, source decoding will be an necessary component as indicated by the dashed block 202 in FIG. 3. A RR feature data set A is then extracted from the visual content in block 205. The RR feature data should be in a very low bit rate due to the limited capacity for data hiding. If the RR feature data has relatively high bit rate, lossless source coding is performed with the feature data as indicated by a block 210 with dashed lines in FIG. 3.

To prevent losing the feature data during the transmission, strong error control codes may be applied. The data hiding module 216 residing in embedding unit 215 embeds both the RR feature data set A and A's protection codes to the transmitted visual content which is generated by the visual content source coding block 220. To achieve the synchronization of embedding unit with the evaluating unit (where the assessment unit is located), a synchronization header 217 is also embedded into the transmitted visual content.

Figure 4:
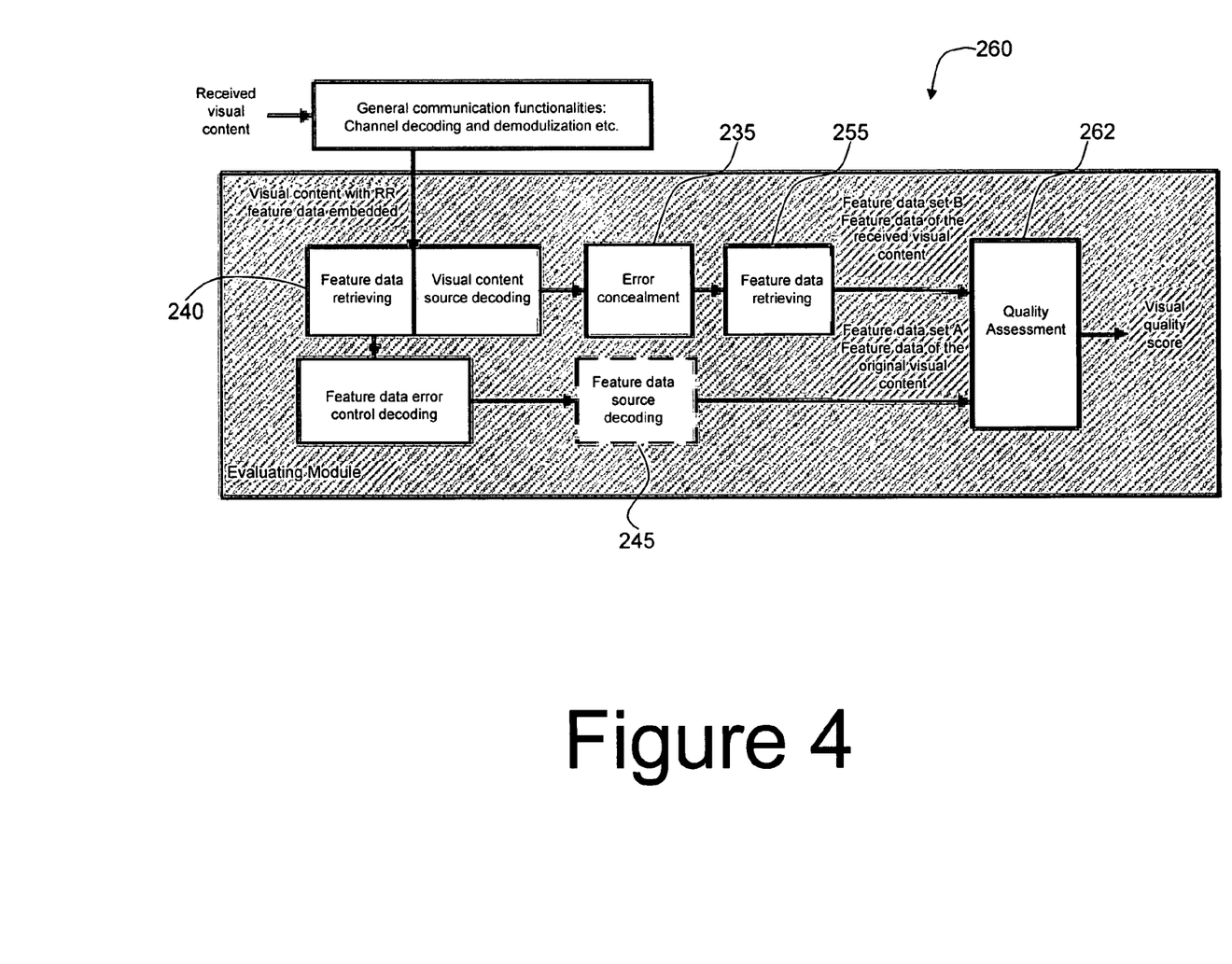
FIG. 4 illustrates one embodiment of an assessment unit.

As shown in FIG. 4, an evaluating module resides in the assessment unit 260 then retrieves (and decodes) the feature data set A in blocks 240 and 245 upon receiving the visual content and performing synchronization, for example, by using the synchronization header 217. The evaluating module performs video content source decoding in block 235 and then extracts the feature data set B from the received visual content in block 255. The assessment block 262 then compares the features data set A with the feature data set B in order to perform a quality assessment of the received video content.

It should be noted that the data hiding module embeds both the feature data and its protection codes in a wide-spread manner. This ensures that the feature data experiences the similar impairments as the visual content itself. If the feature data can not be recovered due to an overwhelming amount of information loss during transmission, the quality assessment system cannot evaluate the visual quality based on the RR method. Instead, in these situations, the quality assessment system reasonably reports that the delivered visual content has bad quality due to severe impairments.

II. Deployment Schemes and Design Issues

In this section, the certain embodiments of the present invention provides a novel deployment scheme for the Visual Quality Assessment (VQA) system, namely, transmitter-embedding pseudo-passive VQA scheme. In addition, a relatively traditional deployment scheme that could be used to deploy the proposed VQA system is also described. Design issues involved in these schemes are discussed.

Traditional quality assessment schemes could be divided into two categories: active schemes or passive schemes. Active schemes perform quality assessment by injecting network traffic into the network under test. Passive schemes measure live application traffic transmitted over the network under test. Though a passive scheme is ideal for in-service monitoring of visual communications, only NR VQA is naturally suitable for this scheme. As described in the background section, NR methods may not achieve satisfactory accuracy. The demand for passive quality assessment schemes motivates transmitter-embedding pseudo-passive VQA scheme of certain embodiments of the present invention which exploits system of RR VQA using data hiding as described earlier herein.

Figure 5:
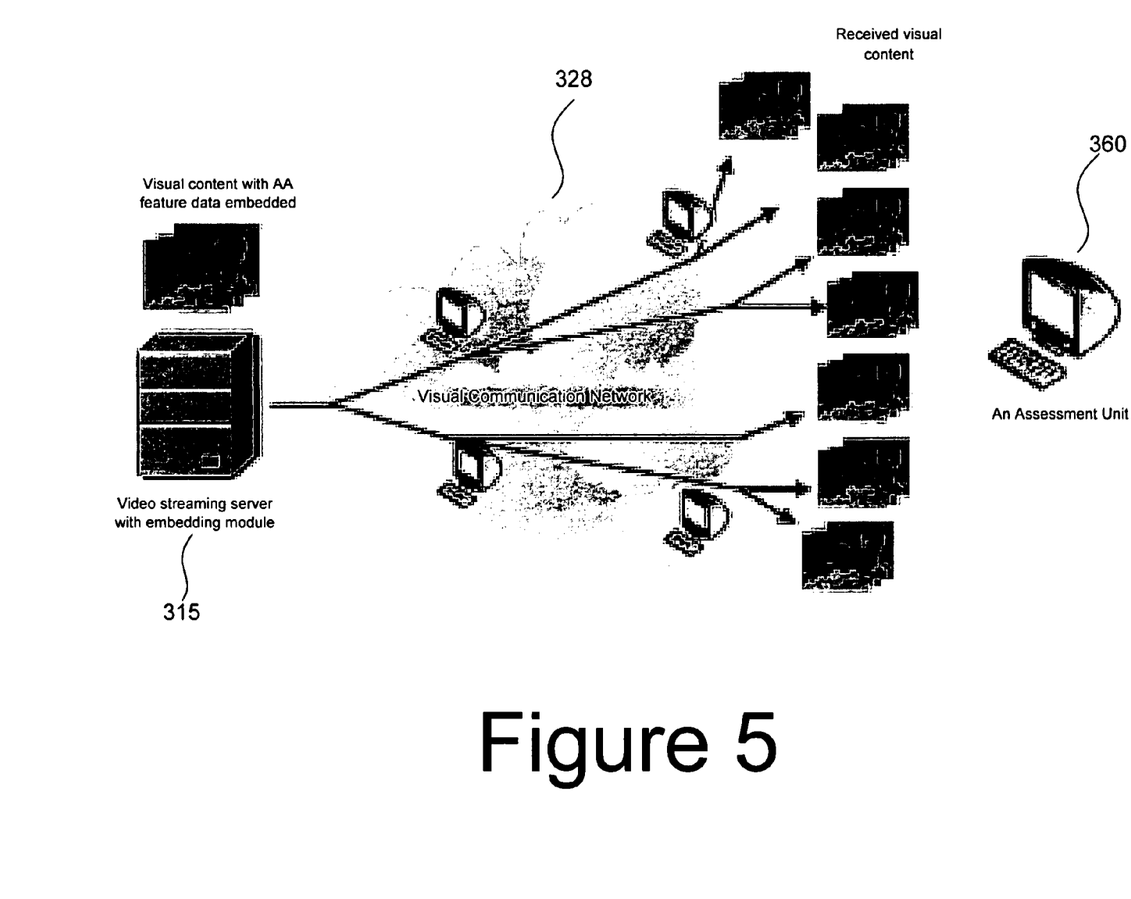
FIGS. 5 and 6 illustrate the arrangement of embedding units and assessments units in a broadcast or multicast environment.

Transmitter-embedding pseudo-passive VQA scheme, referred to hereafter as TEPP-VQA, can be used for an unicast or multicast/broadcast multimedia service. FIG. 5 shows the TEPP-VQA for a multicast/broadcast service over a visual communication network 328. As shown in FIG. 5, the RR feature data is embedded at the transmission node (e.g., a video streaming server with embedding module 315) and the evaluating modules of visual quality assessment system 360 only monitor the visual content traffic through a mirror port. The leading RR VQA technique usually works on a sequence of video frames. See, for example, M. Pinson and S. Wolf, LOW BANDWIDTH REDUCED REFERENCE VIDEO QUALITY MONITORING SYSTEM, in *First International Workshop on Video Processing and Quality Metrics for Consumer Electronics*, 2005.

To achieve synchronization of embedding and retrieving, a synchronization header is embedded including a start code and a video sequence length (No. of frames) into a video frame to indicate that it is the first frame in a sequence that the RR feature data is extracted from. TEPP-VQA neither introduces new data traffic into network nor interrupts transmitting the visual content to end user. With proper choice of data hiding techniques, end user should not notice the distortion in the visual content introduced by embedding techniques. Transmission components in the network are not required to perform any new functions for this TEPP-VQA scheme. However, since RR feature data should be considered as the injected information into application traffic, this scheme is called a pseudo-passive scheme.

Figure 6:
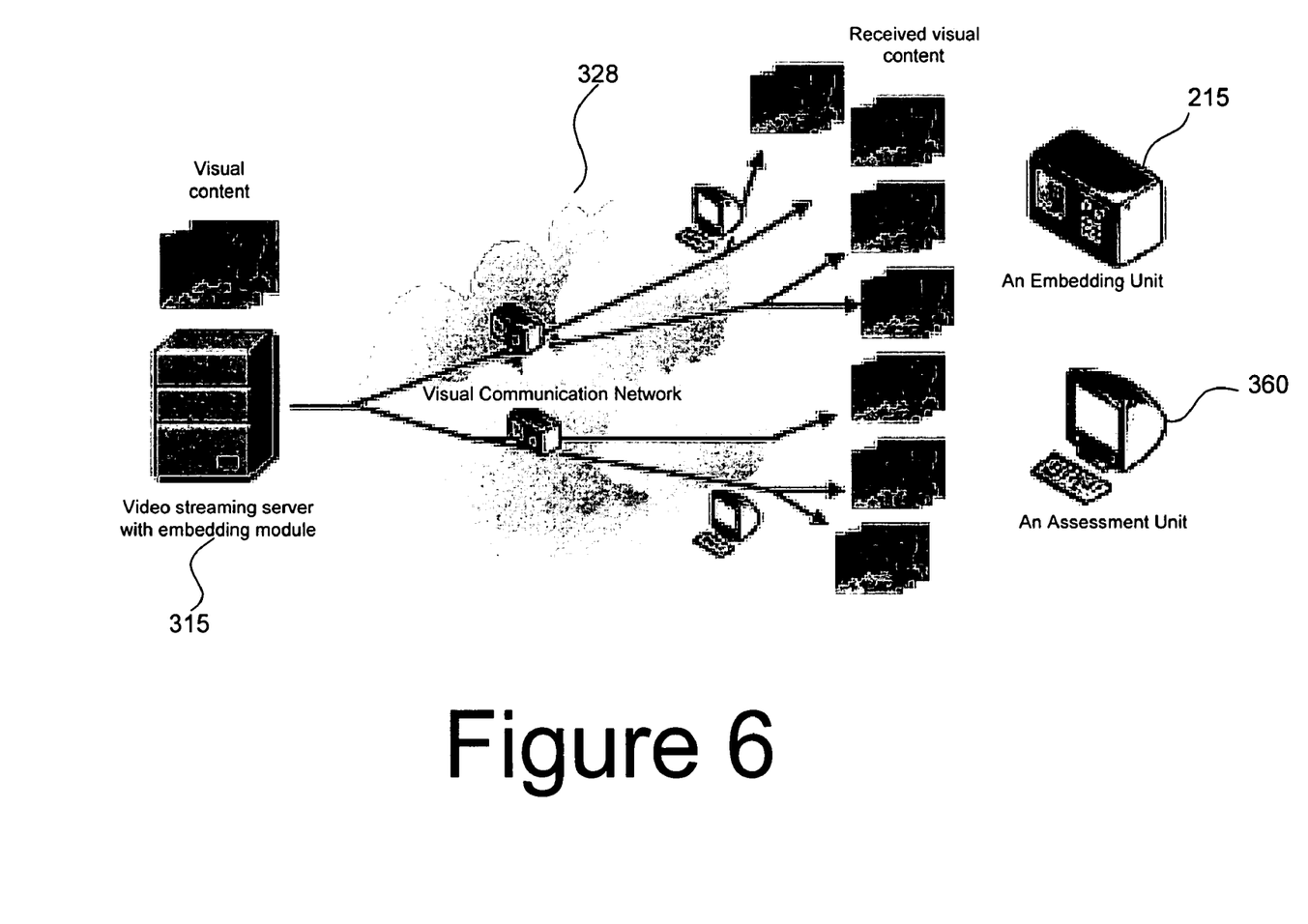

It should be noted that the evaluating modules do not need to cooperate with each other. Therefore, the deployment of these evaluating nodes can be done with great flexibility. By placing evaluating modules at different places in the visual communication network, a thorough evaluation of the delivered visual quality in a multicast/broadcast communication system can be performed. Similarly, it is relatively straightforward to deploy this transmitter driven pseudo-passive monitoring scheme for a unicast multimedia service. RR VQA using data hiding system could also be deployed in a network-probe based quality assessment scheme. FIG. 6 illustrates an embodiment for a multicast/broadcast multimedia service. Note that in this case, the embedding processing need not only be performed in an embedding unit before the visual content is transmitted the down stream assessment units and end users. The embedding unit may cause delay in a transmission path.

To avoid introducing a large delay into the communication networks by feature extraction and data hiding procedure in an embedding unit, this embodiment provides for embedding RR feature data in a chain manner explained as follows. Data hiding could be performed on the compressed visual content symbol. See, for example, M. Wu and B. Liu, DATA HIDING IN IMAGE AND VIDEO: PART-I—FUNDAMENTAL ISSUES AND SOLUTIONS," *IEEE Trans. Image Processing*, vol. 12, no. 6, pp. 685-695, 2003. However, RR feature extraction in the leading RR technique has to be performed on the pixel domain after source decoding. See, for example, M. Pinson et al. Therefore, RR feature extraction has a relatively high computational complexity.

To avoid a large delay that may be caused by the feature extraction, certain embodiments extract the RR feature data "off-line" and embed it into a sequence following the current visual content sequence under test. This idea is visualized in the diagram 700 shown in FIG. 7. For an embedding unit, from time T1 to T2, it receives a sequence of pictures (or video frames) and forwards it for further processing after some minimum processing such as transmission protocol header parsing. Therefore, not much delay is introduced. From time T2 to T3, the embedding unit performs feature extracting on the pictures received and initially processed during T1 to T2. At T3, the feature extraction is completed, it is then embedded into the subsequent sequence from T3 to T4. By using this chain manner embedding, the system performs VQA on the sequence of pictures received from T1 to T2 in a total time period time of T4-T1. Essentially, the RR feature data of a sequence of pictures is embedded into another sequence of pictures (i.e., a subsequent sequence of pictures or video frames).

Figure 7:
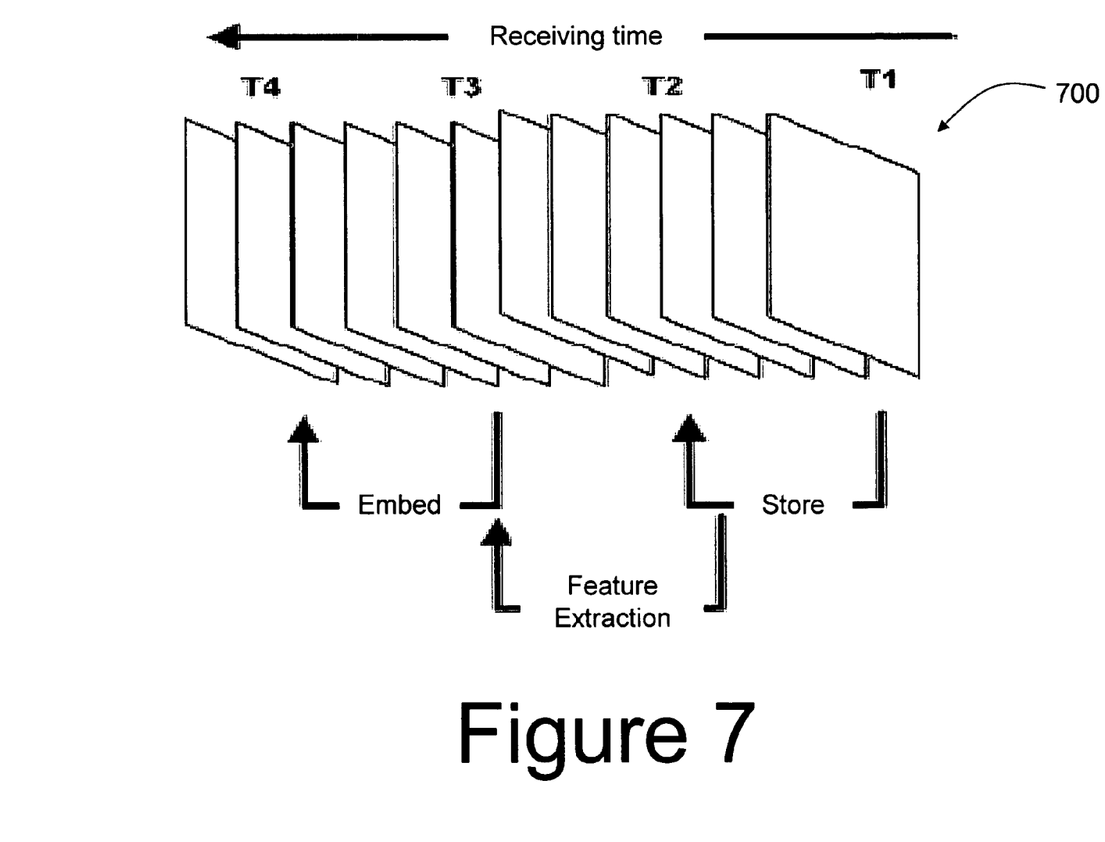
FIG. 7 is a diagram illustrating chained embedding.

In order to facilitate this chain order embedding (and decoding), the synchronization header including a start code, a length of the sequence (No. of frames) that VQA is performed on corresponding to the time T2-T1, and the No. of frames before the current frame that the VQA is performed on (i.e. the No. of frames corresponding to the time from T1 to T3) is necessary to be embedded so that the assessment unit can start retrieving RR feature data from the proper picture frames. To achieve synchronization, the assessment unit needs to buffers the picture frames, with at least the picture frames received during the time duration of T4-T1 being used to perform retrieval of embedded feature data based on the start code provided in the synchronization header. Once the synchronization code is matched, the assessment unit is able to retrieve the synchronization information.

It should be noted that the pseudo-passive scheme and network-probe scheme can be used together in one VQA deployment. For both deployment schemes, adopting the proper techniques is an essential issue. The general goals for RR VQA and data hiding techniques are high correlation to the human visual system perceptual quality evaluation and low degradation to perceptual quality, respectively. Though many VQA techniques and data hiding techniques have been proposed in recent years, they are investigated independently. Since the goal of certain embodiments of the present invention is to integrate these two technologies, there are additional requirements listed as follows due to their important roles in the RR VQA using data hiding system and its deployment scheme discussed herein.

(1) Very low bit rate of the RR feature data. The RR feature data of the visual quality assessment technique should be in a very low bit rate due to the limited capacity for the data hiding.

(2) Invisibility of the embedded message to the RR metrics. The data hiding technique has to be carefully selected so that the embedding procedure has negligible effect on the RR feature data of the original visual content.

Based on these two requirements, the following section describes an embodiment of the RR VQA using the principles and techniques described herein together with some experimental results from the RR VQA performed in accordance with one embodiment of the present invention.

III. An Example of Visual Quality Assessment Using Data Hiding

RR VQA using data hiding is a general framework that could adopt various quality assessment techniques and data hiding techniques. To illustrate the functionality of each of the components in the embedding unit and quality assessment unit, described herein is an example of using it in image quality assessment. This embodiment adopts a RR image quality assessment mechanism based on wavelet domain statistic model as described in Z. Wang and E. P. Simoncelli, REDUCED-REFERENCE IMAGE QUALITY ASSESSMENT USING A WAVELET- DOMAIN NATURAL IMAGE STATISTIC MODEL, in *Human Vision and Electronic Imaging X, Proc. of SPIE*, 2005, software online available at http://www.cns.nyu.edu/lcv/rriqa/. A data hiding mechanism named even-odd embedding is used in this example as described in M. Wu, H. Yu, and A. Gelman, MULTI-LEVEL DATA HIDING FOR DIGITAL IMAGE AND VIDEO, in *Proc. of SPIE*, 1999.

A. Related Works

Figure 8:
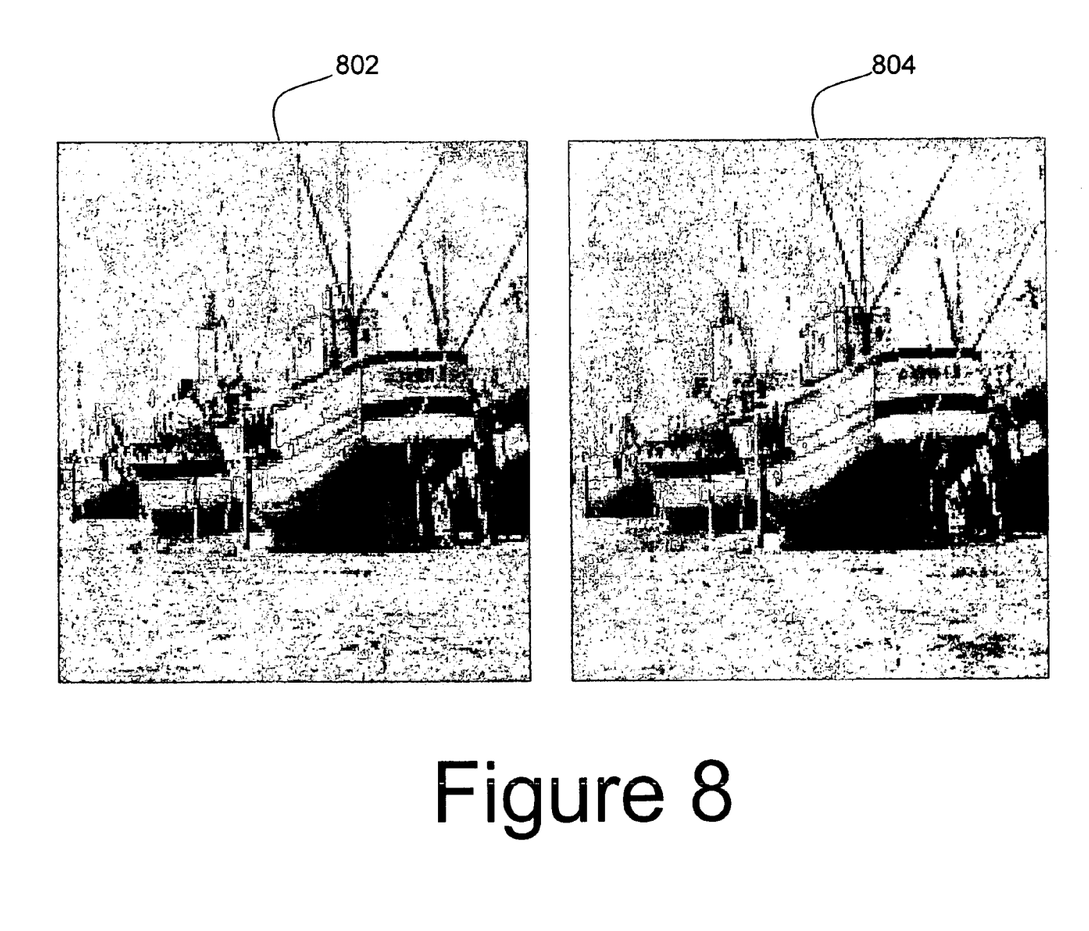
FIG. 8 illustrates a JPEG image before and after it is embedded with RR feature data.

In Wang et al. an image quality assessment based on the natural image statistic model is proposed. The changes of the wavelet coefficients distribution within a given subband is exploited to reflect the image distortions. This technique can use as low as 162 bits to represent the RR feature data of an image with size of 512×512 pixels. A distortion score is reported based on the comparison of the RR feature data. It is highly correlated to the human visual system perceptual quality evaluation. Since the use of block-based codecs is dominant in the image transmission, such as in the JPEG standard, the present embodiment adopts a block based data hiding technique—odd-even embedding which is described in Wu et al. It is a simple version of quantization embedding. A Message (or feature data) is embedded into the last quantized discrete cosine transform (DCT) coefficient in the zig-zag scan order that is non-zero. The coefficient is forced to be even to embed a "0," or odd to embed a "1". This embedding technique does not alter the compressed image stream length and has negligible impact on the image perceptual quality as shown in FIG. 8 in which image 802 illustrates a JPEG image while image 804 depicts the same JPEG image with feature data embedded in accordance with the principles of certain embodiments of the present invention.

B. Error Control and Embedding Pattern

Figure 10:
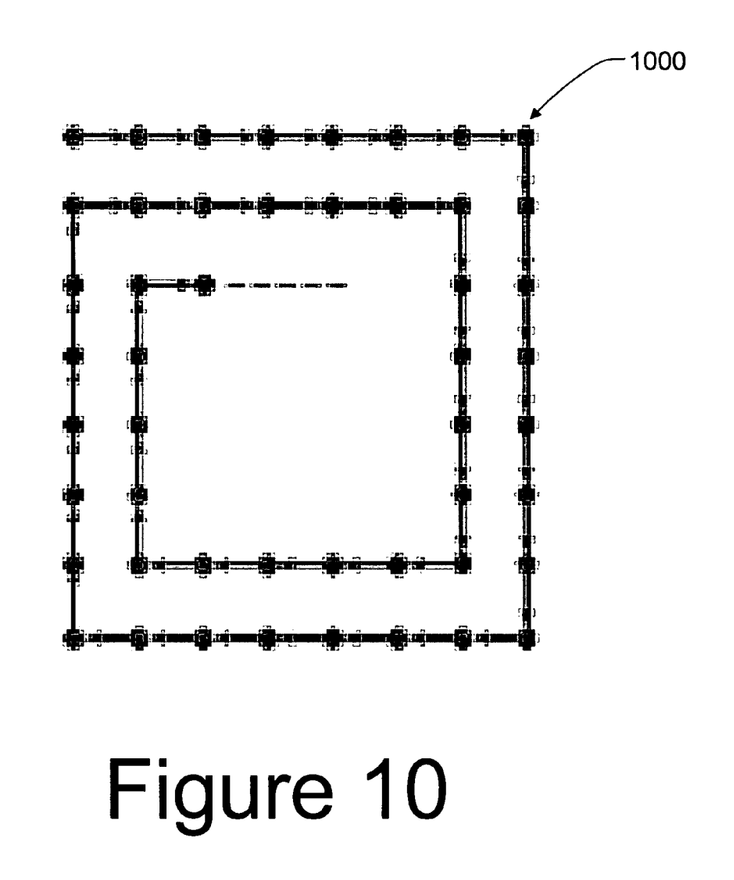
FIG. 10 is a diagram illustrating the embedding of RR featured data in a peripheral area of an image.

The RR feature data embedding scheme is evaluated on the images with size of 512×512 pixels. As mentioned earlier, 162 bits are used to represent the RR feature data. The lossless RR feature data source coding is omitted because the RR metrics adopted have a very low bit rate. Reed-Solomon (RS) error protection codes are used because of its excellent performance. See, for example, S. B. Wicker, ERROR CONTROL SYSTEMS FOR DIGITAL COMMUNICATION AND STORAGE. Prentice Hall, 1995 A (63,9) RS code (i.e., rate of 1/7) with symbol size of 6 bits is applied to generate 972 protection bits for 162 bits of the RR feature data. As a result, a total of 3 code words with 63 symbols per word are embedded into the original image. Odd-even embedding is exploited on 8×8 block size, and the total embedding capacity is 4096 bits. The RR feature data is embedded in a layered pattern 1000 as shown in FIG. 10 in which the RR feature data is mostly embedded in the peripheral areas of the image because the human visual system tends to concentrate on the center area of the image. Since only 1134 bits have to be embedded into the image, the center area of the host image can be reserved without the embedding loss.

If less than 54 out of 63 code symbols in a RS (63,9) code word are erased, or less than 27 out of 63 code symbols in a code word are incorrectly received, the RR feature data can be fully recovered. If greater loss occurs, the RR feature data embedded can not be fully recovered, and the quality assessment scheme will report "low perceptual quality delivered," which is a reasonable assessment as discussed earlier herein.

C. Experimental Results

Applicants have performed some preliminary experiments to illustrate the effectiveness of this scheme described herein. In these experiments, the end-to-end image quality of a visual communication system is evaluated. It gives the overall performance evaluation of the system. The "Fishing boat" (as shown in FIG. 8) and "Elaine" (not shown) are the images used in the simulation and applicants have achieved similar results for other images. JPEG compression with a quality factor of 80 is used in the simulation. For simplicity, random block loss is used to simulate the distortion caused by the transmission channel errors. Multiple dimensional interpolation is used as the error concealment technique. See, for example, W. Wilson and H. Sun, MULTI-DIRECTIONAL INTERPOLATION FOR SPATIAL ERROR CONCEALMENT, *IEEE Trans. Consumer. Electron.*, vol. 39, no. 3, pp. 455-460, 1993 The experiments were repeated 20 times and the final distortion scores reported are the averaged results.

Figure 9:
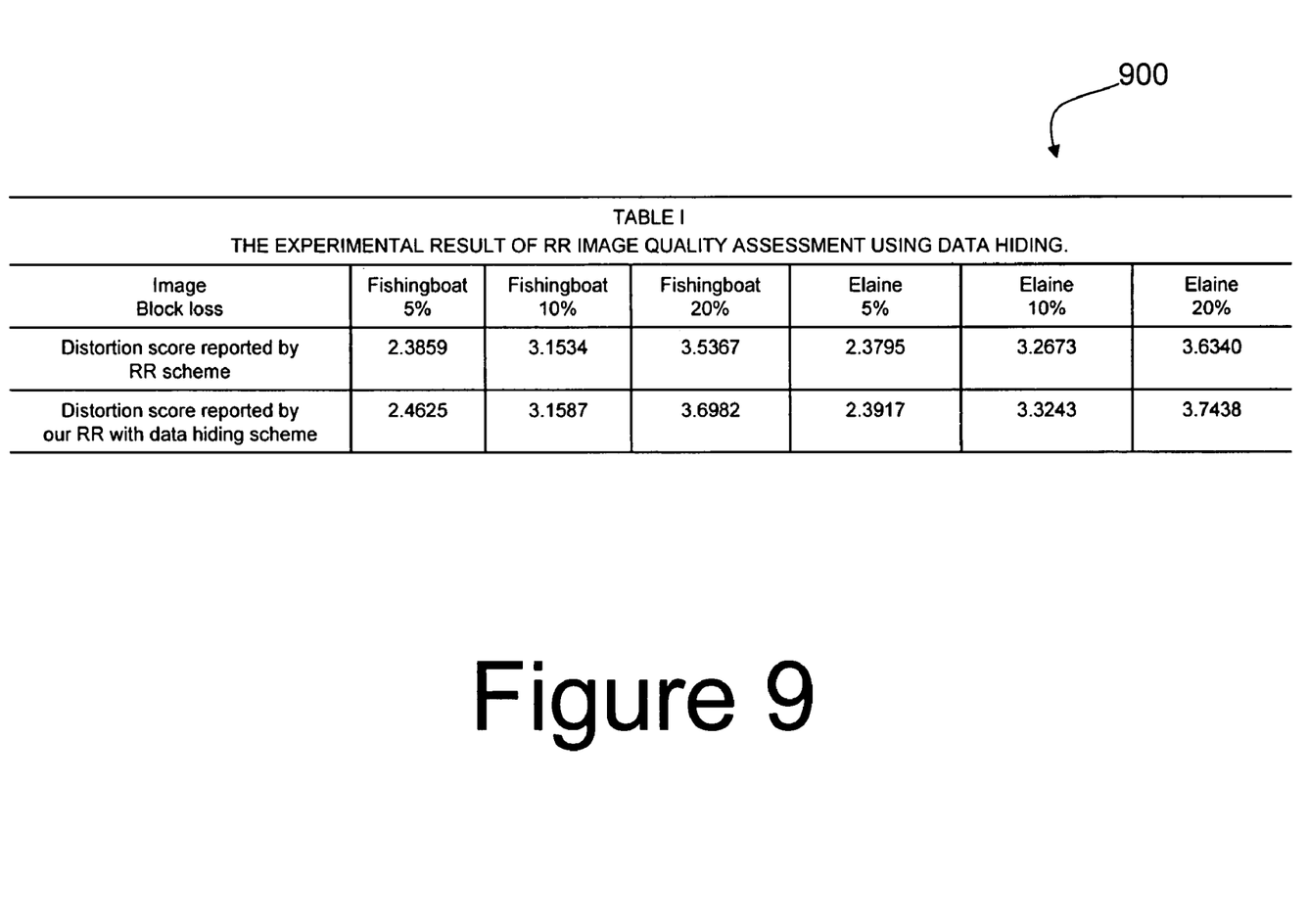
FIG. 9 is a table that illustrates experimental results comparing one embodiment of the present invention to known RR feature data embedding systems.

Table I (element 900 in FIG. 9) shows preliminary experimental results. The second row displays the end-to-end distortion scores by using a known RR image quality assessment scheme, where the feature data is transmitted by an ancillary channel or an attaching method. See, for example, Wang et al. The third row in Table I (element 900) depicts the end-to-end distortion scores by using the RR image quality assessment using a data hiding scheme as described in certain embodiments of the present invention. From the experimental results, it should be noted, first, that the distortion score, which is highly correlated to the human visual system perceptual evaluation, varies from image to image with the same level of network transmission impairment and increases with more severe impairment. This observation supports that the visual content quality assessment is a straight-forward way to provide the essential information from the user's perspective for the network performance evaluation.

Second, it should be noted that the distortion score differences caused by the data hiding are less than 5% of the distortion score from the other known RR image quality assessment schemes without the data hiding. Therefore, the distortion score reported from RR image quality assessment using data hiding scheme is a very good solution for in-service monitoring of visual communication networks performance.

All the references cited in this application are hereby incorporated in their entireties for all purposes.

Other embodiments of the invention will be apparent to those skilled in the art from a consideration of the specification and the practice of the invention disclosed herein. It is intended that the specification be considered as exemplary only, with such other embodiments also being considered as a part of the invention in light of the specification and the features of the invention disclosed herein. Furthermore, it should be recognized that the present invention includes the methods and system disclosed herein together with the software and systems used to implement the methods and systems disclosed herein.

What is claimed is:

1. A system for communicating visual communication quality information, comprising:
   a feature extractor that receives visual content,
      wherein the feature extractor extracts reduced-reference (RR) feature data from the visual content of a first sequence of frames;
   a feature data embedder in communication with the feature extractor,
      wherein the feature data embedder embeds the RR feature data of the first sequence of frames in the visual content of a second sequence of frames completely different from the first sequence of frames; and
   a transmitter in communication with the feature data embedder,
      wherein the transmitter transmits the visual content with the embedded RR feature data, wherein the feature data embedder embeds the feature data in a second set of frames, which corresponds to the second sequence of frames, subsequent to a first set of frames from which the feature extractor extracts the feature data, the first set of frames corresponding to the first sequence of frames, wherein the feature data embedder embeds a synchronization header which specifies a relationship between the feature data embedded in the second set of frames and the first set of frame from which the feature data is extracted, and wherein the synchronization header includes a start code, a length of sequence value corresponding to a number of sequential frames in which visual quality assessment is performed, and a number of frames before a current frame that the visual quality assessment was performed.

2. The system of claim 1, comprising:
a feature data encoder in communication with the feature extractor and the feature data embedder,
wherein the feature data encoder is configured to encode the RR feature data.

3. The system of claim 2, wherein the feature data encoder is configured to compress the RR feature data from the feature data extractor when the RR feature data comprises a high bit rate.

4. The system of claim 2, wherein the feature data encoder is configured to encode the RR feature data using Reed Solomon codes.

5. The system of claim 1, comprising:
a visual content encoder in communication with the feature data embedder and the transmitter,
wherein the visual content encoder is configured to encode the visual content.

6. The system of claim 1, wherein the feature data embedder is configured to distribute the RR feature data evenly throughout the visual content.

7. The system according to claim 6, wherein the feature data embedder distributes the feature data in a layered pattern away from a center area of an image or video frame included in the visual content.

8. The system of claim 1, wherein the feature data embedder is configured to embed the RR feature data in the visual content using odd-even embedding.

9. The system of claim 1, wherein the visual content comprises video frames.

10. A method of communicating visual communication quality information, comprising the steps of:
a.) extracting, by a feature extractor, reduced-reference (RR) feature data from visual content of a first sequence of frames;
b.) embedding, by a feature data embedder, the RR feature data of the first sequence of frames in the visual content of a second sequence of frames completely different from the first sequence of frames; and
c.) transmitting, by a transmitter, the visual content with the embedded RR feature data,
wherein embedding the RR feature data in the visual content comprises embedding the feature data in a second set of frames subsequent to a first set of frames from which the feature data is extracted,
wherein the embedding the RR feature data in the visual content further comprises embedding a synchronization header which specifies a relationship between the feature data embedded in the second set of frames and the first set of frames from which the feature data is extracted, and
wherein the synchronization header includes a start code, a length of sequence value corresponding to a number of sequential frames in which visual quality assessment is performed, and a number of frames before a current frame that the visual quality assessment was performed.

11. The method of claim 10, comprising the step of:
d.) encoding, by a feature data encoder, the RR feature data extracted in step (a).

12. The method of claim 11, comprising the step of:
e.) compressing the RR feature data extracted in step (a) when the RR feature data comprises a high bit rate.

13. The method of claim 11, wherein step (d) is performed using Reed Solomon codes.

14. The method of claim 10, comprising the step of:
d.) encoding, by a visual content encoder, the visual content.

15. The method of claim 10, wherein step (b) comprises the step of:
b1.) distributing the RR feature data evenly throughout the visual content.

16. The method according to claim 15, wherein distributing the RR feature data throughout the visual content comprises distributing the feature data in a layered pattern away from a center area of an image or video frame included in the visual content.

17. The method of claim 10, wherein step (b) is performed using odd-even embedding.

18. The method of claim 10, wherein the visual content comprises video frames.

* * * * *